(12) United States Patent
Ittel et al.

(10) Patent No.: US 7,409,692 B2
(45) Date of Patent: Aug. 5, 2008

(54) SOFTWARE COMPONENT ARCHITECTURE

(75) Inventors: Jens Ittel, Rauenberg (DE); Markus Cherdron, Muehlhausen (DE); Bjoern Goerke, Muehlhausen (DE)

(73) Assignee: SAP AG, Walldorf (DE)

( * ) Notice: Subject to any disclaimer, the term of this patent is extended or adjusted under 35 U.S.C. 154(b) by 857 days.

(21) Appl. No.: 10/676,844

(22) Filed: Sep. 30, 2003

(65) Prior Publication Data

US 2005/0071850 A1    Mar. 31, 2005

(51) Int. Cl.
G06F 3/00      (2006.01)
G06F 9/44      (2006.01)
G06F 9/46      (2006.01)
G06F 13/00     (2006.01)

(52) U.S. Cl. .................................. 719/320; 717/106
(58) Field of Classification Search ................ 719/316, 719/320
See application file for complete search history.

(56) References Cited

U.S. PATENT DOCUMENTS

| | | | | |
|---|---|---|---|---|
| 5,426,747 | A * | 6/1995 | Weinreb et al. | 711/203 |
| 6,230,309 | B1 * | 5/2001 | Turner et al. | 717/107 |
| 6,748,455 | B1 * | 6/2004 | Hinson et al. | 719/318 |
| 7,117,480 | B2 * | 10/2006 | Andersh et al. | 717/120 |
| 2003/0046395 | A1 * | 3/2003 | Fleming et al. | 709/226 |

OTHER PUBLICATIONS

Template Software, Inc., Using the SNAP Language (LANG), Chapters 1 and 3, copyright 1998, released 1997, pp. 1-5 and 3-4.*
Template Software, Inc., Using the SNAP Communication Component (COM), Chapter 5, copyright 1998, released 1997, pp. 5-2,5-9, and 5-10.*
Template Software, Inc., Getting Started with SNAP (START), Chapters 1 and 5, copyright 1998, released 1997, pp. 1-5, 5-3 and 5-17.*
Template Software, Inc., Using the SNAP External Application Software Component (EXT), Chapters 2 and 3, copyright 1998, released 1997, pp. 2-2, 3-2, and 3-3.*
Template Software, Inc., Using the SNAP Development Environment (SNAPDEV), Chapters 1,3, 4, and 5 copyright 1998, released 1997, pp. 1-5, 3-2, 4-2, 4-5, 4-6, and 5-3.*

* cited by examiner

Primary Examiner—William Thomson
Assistant Examiner—KimbleAnn Verdi
(74) Attorney, Agent, or Firm—Fountainhead Law Group P.C.

(57) ABSTRACT

Methods and apparatus, including computer program products, implement techniques for structuring applications into reusable components. A reusable software component is implemented. The component encapsulates functionality, where multiple instances of the component are usable at the same time. The component has at least one visual representation. The component has a programming interface for programmatic interaction with the component, a data-binding interface for data communication with the component, and a visual interface to access the at least one visual representation of the component.

15 Claims, 9 Drawing Sheets

SOFTWARE COMPONENT ARCHITECTURE

BACKGROUND

The present invention relates to electronic data processing in general, and particularly to application programming.

Applications can be developed using various architectures, including, for example, a model-view-controller (MVC) architecture. The MVC architecture breaks an application into three separate parts—models, views, and controllers. Each model can have multiple views, where each view displays information about the model to a user. A controller of the model receives events, for example, raised by a user interacting with a view to manipulate the model. Each model can have multiple controllers, and a controller can relate to multiple views. The models and the controllers typically include application code. When changes occur in a model, the model updates its views. Data binding is used for data transport between the view and its model or controller. For example, a table view can be defined to display data of a corresponding table that is stored in the model or controller. The table is used as the data source for the table view (data binding). For example, the table view can be replaced by a further view, such as a graph view, that binds against the same table. In this case, the further view displays the table data without changing anything in the controller or the model.

Application development is often divided into two general stages: design time and runtime. Design time can include designing the views of an application (including the layout of the user interface (UI) elements in each view), modeling of the application flow (including the selection of the views to displayed), designing one or more models, and creating and editing other application elements, such as controllers and contexts. Design time can also include the binding of UI elements within the views to data sources that are defined in a data type repository.

Information created during the design time can include application metadata. Application metadata can be stored in a metadata repository, and used as input to the runtime process. During the runtime process, the application metadata can be used to generate the actual runtime code of an application. In some implementations, the application metadata is platform independent, and the generated runtime code is platform specific. The runtime code can be executed in a runtime environment that provides a general framework for running applications. For example, a runtime environment can provide services for deploying and maintaining applications, as well as features such as a caching mechanism that can be used to improve performance, and automatic input assistance and default error handling that is based on the declared application metadata.

Regardless of which architecture is used, it is often desirable to structure an application (including, for example, the models, views, and controllers that make up an MVC application) into reusable entities or components. The reusable components can be embedded by the application, or by another reusable component.

SUMMARY OF THE INVENTION

In general, in one aspect, the invention provides methods and apparatus, including computer program products, implementing techniques for structuring applications into reusable components. The techniques include implementing a reusable software component encapsulating functionality, where multiple instances of the component are usable at the same time. The component has at least one visual representation. The component has a programming interface for programmatic interaction with the component, a data-binding interface for data communication with the component, and a visual interface to access the at least one visual representation of the component.

Advantageous implementations of the invention include one or more of the following features. The programming interface, the data-binding interface, and the visual interface can be separate interfaces. One or more controllers can be implemented for the component, each controller having an associated context for storing data and state for the controller. One or more views can be implemented for the component, each view providing a visual representation of the component. A sub-component can be embedded in the component. The sub-component can be embedded using a programming interface, a data-binding interface, and a visual interface of the sub-component. The programming interface can include an interface controller having an associated interface controller context and a configuration controller having an associated configuration controller context, the visual interface can include an interface view, and the data-binding interface can provide context mapping for an interface controller context and a configuration context.

In another aspect, the invention provides methods and apparatus, implementing techniques for implementing an application runtime framework. A component interface to be used in an application is received without a specification of a corresponding component implementation. A particular component implementation can be instantiated at runtime, where the particular component implementation is selected from one or more component implementations corresponding to the component interface.

Advantageous implementations of the invention also include a component interface having a programming interface, a data-binding interface, and a visual interface.

In another aspect, the invention provides methods and apparatus, implementing techniques for implementing an application runtime framework. An event subscription for a subscribing component is received, where the event subscription specifies one or more events generated by sub-components embedded by the subscribing component. If the subscribing component has not been instantiated, any events generated by the sub-components that are specified by the event subscription are cached. The cached events are forwarded to an instance of the subscribing component after the subscribing component has been instantiated.

In another aspect, the invention provides methods and apparatus, implementing techniques for implementing an application runtime framework. One or more context mappings for a component are received, where the context mappings are specified by a component embedder using the component to exchange data with the component. If the component has not been instantiated, the specified context mappings are cached. The specified context mappings are created after the component has been instantiated.

The invention can be implemented to realize one or more of the following advantages. An application development framework provides support for developing software components and managing multiple instances of such components. An application can use multiple instances of a component, and components can be used in multiple applications. Developers do not need to write code to manage multiple component instances.

Components can contain multiple controllers, and storage areas known as contexts. Components can present multiple views. Each component can be accessed through multiple interfaces, including an application programming interface (API), a data binding interface, and a visual interface.

The API can be implemented in an interface controller that is used to interact with the component. Components can also include other types of controllers, including configuration controllers (used to access configuration data, which can be provided at runtime), view controllers (used to implement functionality for views), component controllers (used to implement common functionality required for multiple views), and custom controllers (used to implement application functionality). Each controller can have an associated context, and the controllers can share data by mapping data elements from one context to another context. The data binding interface is used to access the associated contexts of the controllers of the component. The view interface can be used to access the views of the component.

Components can be embedded in other components, thus creating hierarchical arrangements of components. A component embedder that embeds a component can use the visual representations of the embedded component—that is, the arrangement of views for a component can include views from embedded components.

Configuration data for a component can be provided by a component embedder at runtime, when the component is instantiated. Application programmers can program against a component interface at design time without specifying a component implementation that implements the component interface, and the component interface can be resolved to a component implementation implementing the component interface at runtime. Components can subscribe to and act on events from embedded components. If there are no instances of a subscribing component, events can be cached and delivered to instances of the subscribing component when they are created. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
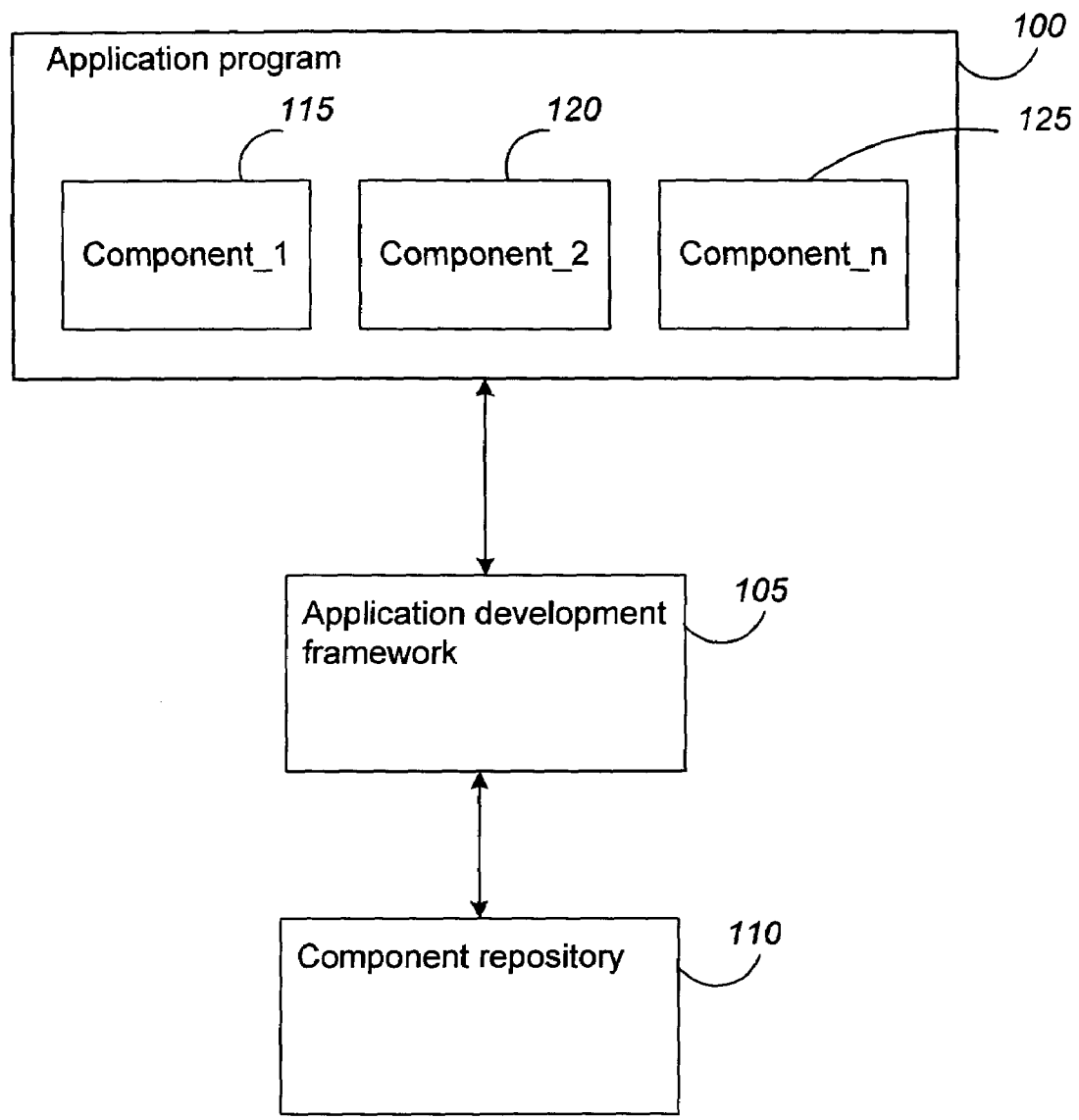
FIG. 1 is a block diagram of a development environment for developing an application program using reusable components.

FIG. 1 is a block diagram of an environment for developing an application program 100 using reusable components. The development environment includes an application development framework 105 and a component repository 110. The application program 100 is developed using reusable components available in the component repository 110, e.g., components 115, 120, and 125. A component in the component repository 110 can have more than one instance, where the component instances are being used in multiple application programs. The application program 100 is developed at design time using the application development framework 105.

At runtime, the application runs within a runtime framework that provides the code required to create and manage the instances of the components used by the application program 100. As discussed below, the services provided by the runtime framework include component lifecycle management and managing component event subscriptions.

Figure 2A:
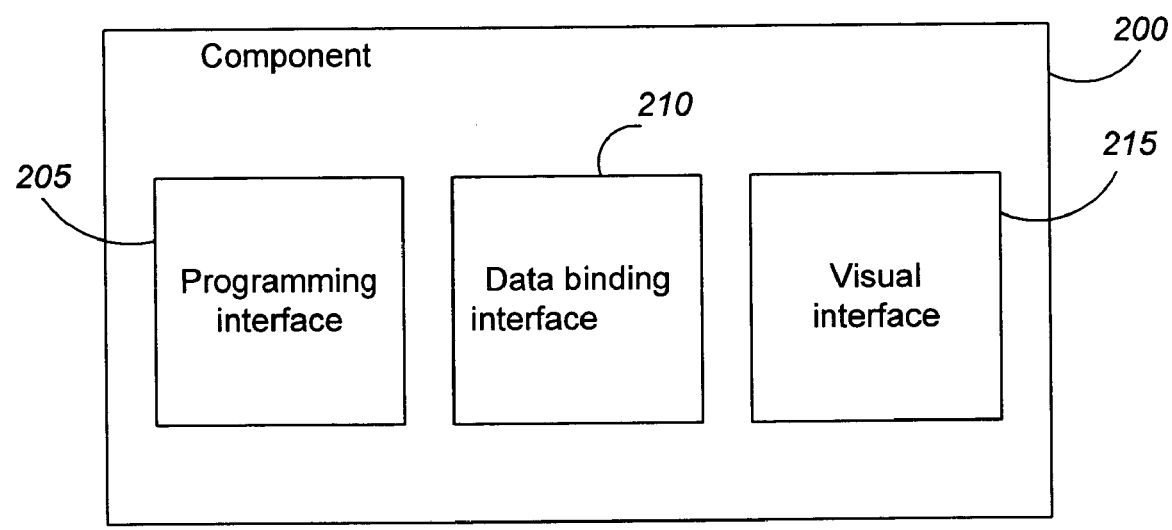
FIG. 2A is a block diagram of a component.

FIG. 2A is a block diagram of a component 200. The component 200 is a reusable entity providing functionality that can by used by many applications (or that can be used multiple times by the same application). Components 200 can be embedded, and they can have zero or more visual representations. A component having no visual representations cannot be displayed. An application or a component that embeds the component 200 is referred to as a component embedder for the component 200, and the component 200 is referred to as the embedded component.

The component 200 provides three separate interfaces-a programming interface 205, a data binding interface 210, and a visual interface 215. The programming interface 205 is used by the component embedder (by controller usage 315) to interact with the component 200. The component interface is an active component. The component interface is not just a signature. The component interface defines the component methods that are visible to the component embedder and routes the visible method calls to one or more component implementations. The component embedder embeds the component 200 by programming to the programming interface 205, i.e., the component embedder can call the methods provided by the programming interface 205. In one implementation, the programming interface 205 can be provided by a controller, referred to as a component interface controller. Thus a component embedder can interact with an embedded component through the interface controller of the embedded component.

The component 200 also has one or more visual representations (which will be referred to as views). As described below, a component embedder can access and use the visual representations of the component 200 (for example, to form its own visual representations in view composition 325) through a visual interface 215.

The data binding interface 210, described below, is used by a component embedder to exchange data with the component 200.

In one implementation, the component 200 includes one or more controllers, one or more associated contexts, and optionally one or more views. The controllers are used to implement the logic of the component, and the views provide a visual representation of the component. A component can include multiple types of controllers, as explained below. The controllers implement event handlers that are executed in response to an action performed by a user, e.g., pressing a button or making a menu selection. Each controller is bound to an associated context. A context is a local data structure for a controller that stores data and state specific to the controller.

Figure 2B:
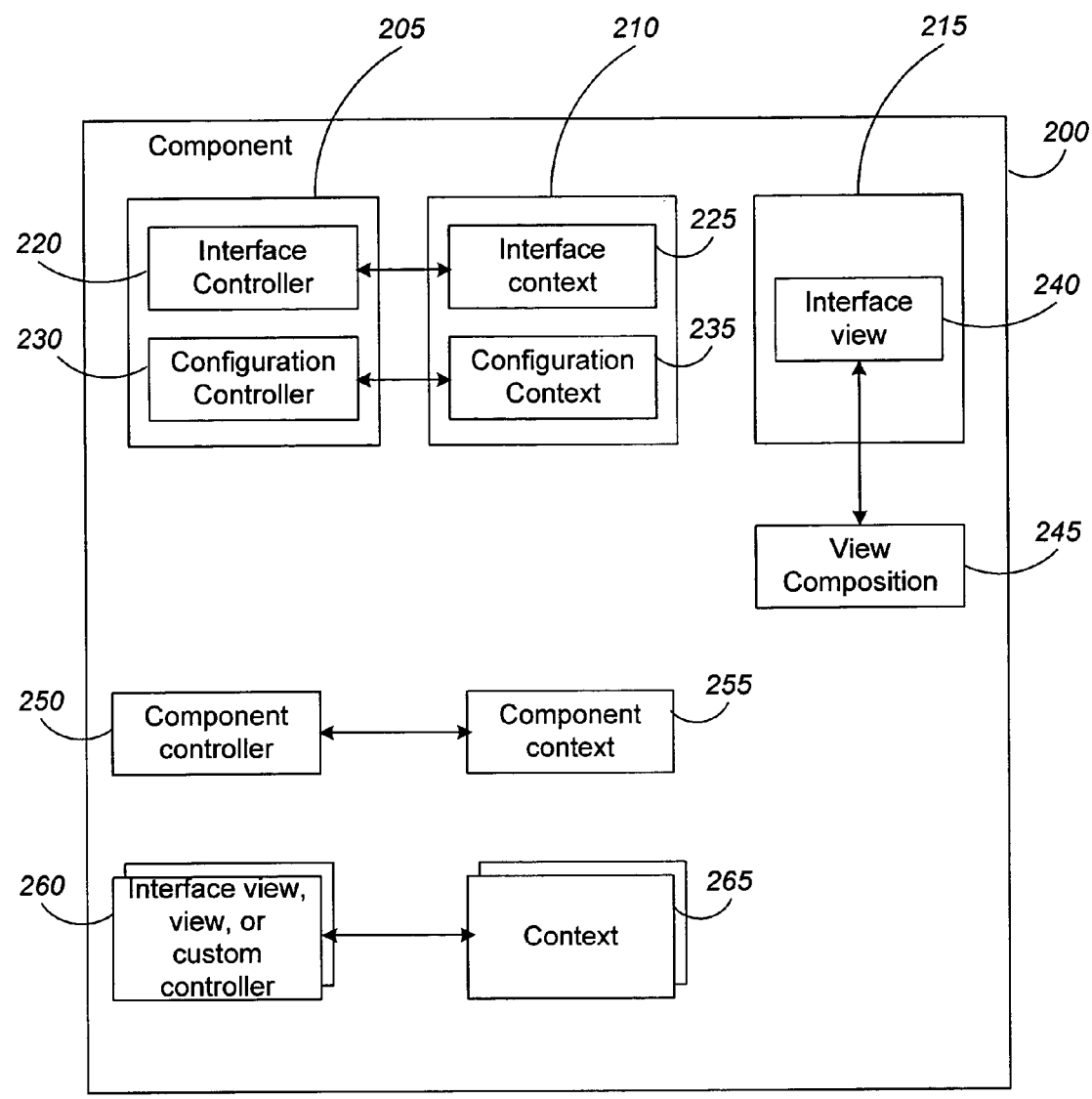
FIG. 2B illustrates further features of a component.

FIG. 2B illustrates further features of a component 200. The programming interface 205 for the component 200 includes an interface controller 220 and a configuration controller 230. The interface controller 220 implements methods that can be used (e.g., by a component embedder) to interact with the component 200. The configuration controller 230 provides access to configuration data for the component 200. The interface controller 220 has an associated interface context 225 that stores data and state for the interface controller 220. The configuration controller 230 has an associated configuration context 235 that stores configuration data for component 200. The component embedder uses the data binding interface 210 to exchange data with the interface context 225 and the configuration context 235. The runtime framework initializes the configuration context 235 when an instance of the component 200 is created at runtime using configuration data provided by the component embedder. The configuration data stored in the configuration context can include data used by the component embedder to customize the component 200, e.g., font size, and selection of fields for a table view.

Figure 4:
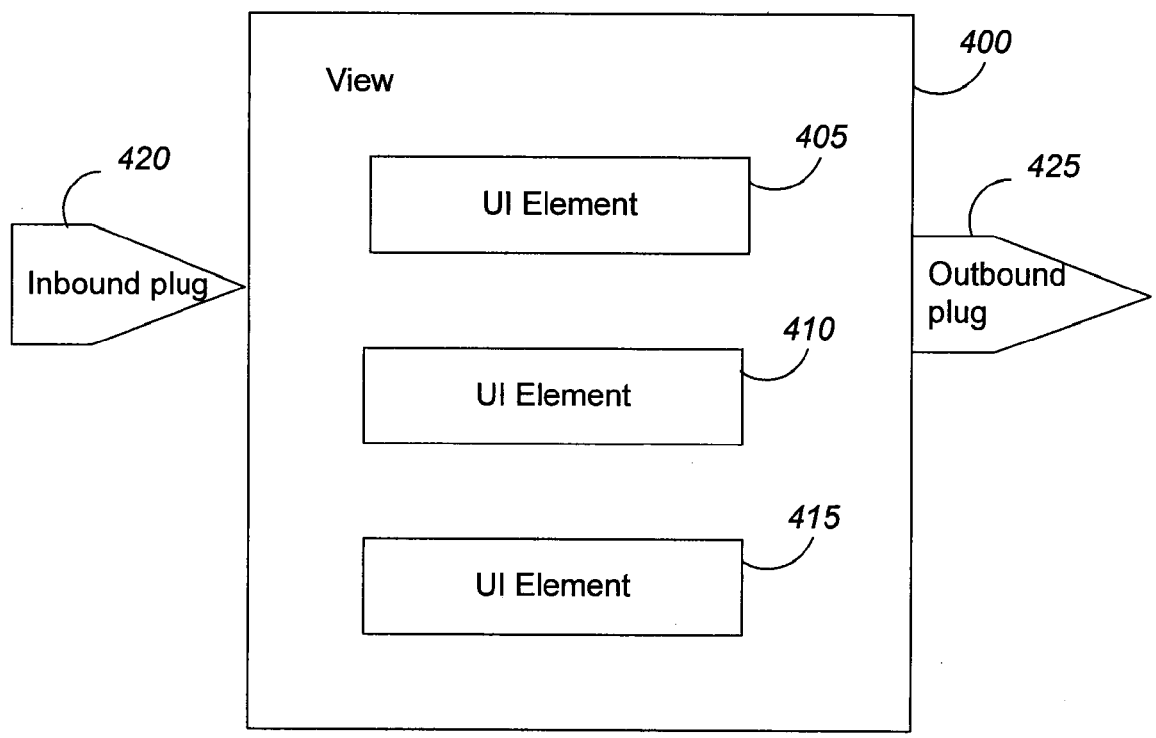
FIG. 4 is a block diagram of a view.

FIG. 4 is a block diagram of a view. A visual interface of a software application is made up of one or more views arranged in a specific layout. A view 400 specifies a layout of at least one user interface element (UI) element 405, and a view area. UI elements 405, 410, 415 in a view can include buttons, labels, and menus. The view area defines the area to be occupied by the view 400 in a visual interface embedding the view 400. The UI elements included in the view 400 can include Input UI elements, View UI elements, and Container UI elements. An Input UI element is used to receive input from the user, e.g., a drop down menu, an input field, or a table UI element. A View UI element is used to display application data, e.g., an image view, a text view, or a caption. A Container UI element, described below, is used to include other views and UI elements, e.g., a scroll container UI element having a scroll bar, or a container UI element specifying a layout for included views.

The visual interface can have more than one view, of which only some views are visible at any time. The views that are visible in the visual interface can change, e.g., the views that are visible can change in response to input from the user. Inbound plugs, outbound plugs, and navigation links are design time constructs that are used by application developer to specify transitions between the views. Each view has an inbound plug 420 and an outbound plug 425. At design time, each navigation link establishes a potential transition from the view with the outbound plug 425 to the view with the inbound plug 420. At design time, a transition from a first view to a second view is specified by connecting the outbound plug 425 of the first view to the inbound plug of the second view. The navigation links are processed at runtime to cause the view transitions specified at design time. At run time, the application calls the outbound plug of the first view to cause a transition from the first view to the second view.

Each inbound plug 420 includes an application specific event handler, and calling the inbound plug results in running the event handler for the inbound plug 420 before displaying the view 400 corresponding to the inbound plug 420. Navigation links are typically processed in a runtime framework by calling all the inbound plugs 420 connected to an outbound plug 425 when the outbound plug 425 is called. The event handler for an inbound plug 420 can call the outbound plug 425 for the view corresponding to the inbound plug to cause other views connected to the outbound plug 425 to be displayed. The application can use the event handler for the inbound plug 420 to initialize the corresponding view, e.g., the corresponding view can be initialized based on why the view is being displayed.

The view 400 can have an associated view controller that includes the event handlers associated with the inbound plug. The view controller also contains event handlers for the UI elements in the view as well as the presentation logic for the view.

The application or a reusable component can specify any number of views at design time, any of which can be displayed at runtime. The set of views that can be displayed, for the application or the component, is referred to as the view composition. A view assembly is the set of views that are actually displayed at runtime. The view assembly, for an application or a component, consists of views in the view composition that selected for display at a certain point in time. When a navigation link is processed at runtime, a view in a current view assembly may be replaced by one or more destination views from the view composition.

Figure 5:
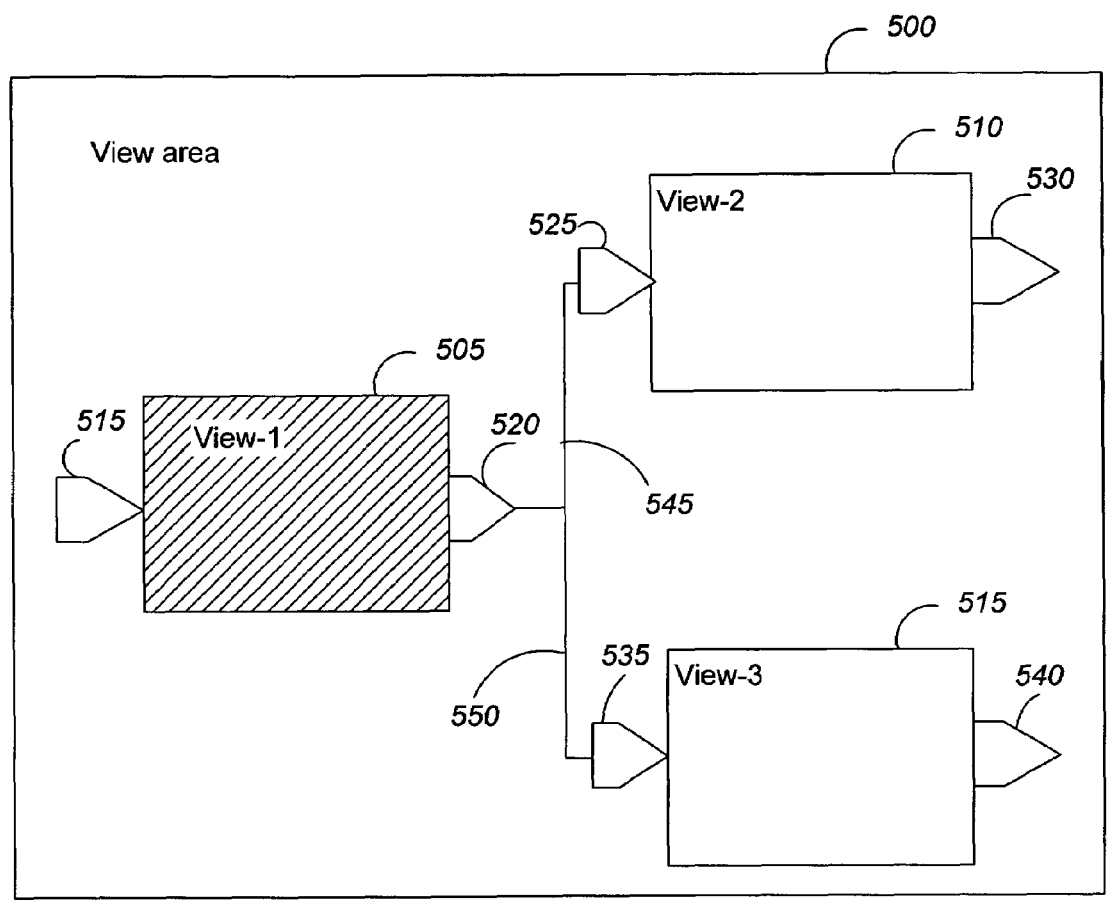
FIG. 5 illustrates a visual interface with multiple views that are linked together using navigation links.

FIG. 5 illustrates a visual interface with multiple views that are linked together using navigation links. Each navigation link connects an inbound plug to an outbound plug. The view area 500 includes three views 505, 510, and 515, of which view 505 is currently displayed in the view area 500. View 505 has inbound plug 515 and outbound plug 520. View 510 has inbound plug 525 and outbound plug 530. View 515 has inbound plug 535 and outbound plug 540. Outbound plug 520 is connected to inbound plug 525 by a navigation link 545, and outbound plug 520 is connected to inbound plug 535 by a navigation link 550. If view 505 activates outbound plug 520 by triggering the specified event for the outbound plug 520, views 510 and 515 are displayed in the view area 500 instead of the view 505.

Applications can make use of components that contain view compositions. Components can embed other components, such that a first component can interact and make use of a second, embedded, component. The view composition of the first component can include views of the second component. Similarly the view composition of the application can include views of the components used by the application. In addition, an application developer can design application specific views that are part of the application's view composition.

A component developer designates one of the views in the view composition 245 of the component as an interface view 240. The interface view 240, and the associated inbound plug and outbound plug, are the visual interface for the component 200. At design time, the component embedder can use navigation links to specify view transitions to the interface views 240 of embedded components 200 like any other view in the view composition of the component embedder. A component can present more than one visual interface by defining more than one interface view.

Each view has a view controller and a view context associated with the view controller. The view controller implements presentation logic implemented by the view such as triggering events in response to user interaction with user interface elements in the view. The view context stores data and state associated with the view controller. The view context can be used to communicate data between the view and any controller of the component 200 by mapping the view context to the context of the controller.

Referring to FIG. 2 the component 200 can also include a component controller 250 that implements common functionality required by views implemented by the component. The component controller receives control when the component is instantiated, after the component instance has been initialized. The component controller 250 has an associated component context 255 for storing data and state for the component controller. The component 200 can also include one or more custom controllers 260, and associated contexts 265. The custom controllers 260 and associated contexts 265 are used to implement and structure functionality and data storage for the component 200.

The component embedder interacts with the embedded component 200 by using the programming interface 205, the data binding interface 210, and the visual interface 215. The embedded component 200 can interact with the component embedder by generating events.

The component embedder can subscribe to events generated by the embedded component 200, and react to such events.

Figure 3:
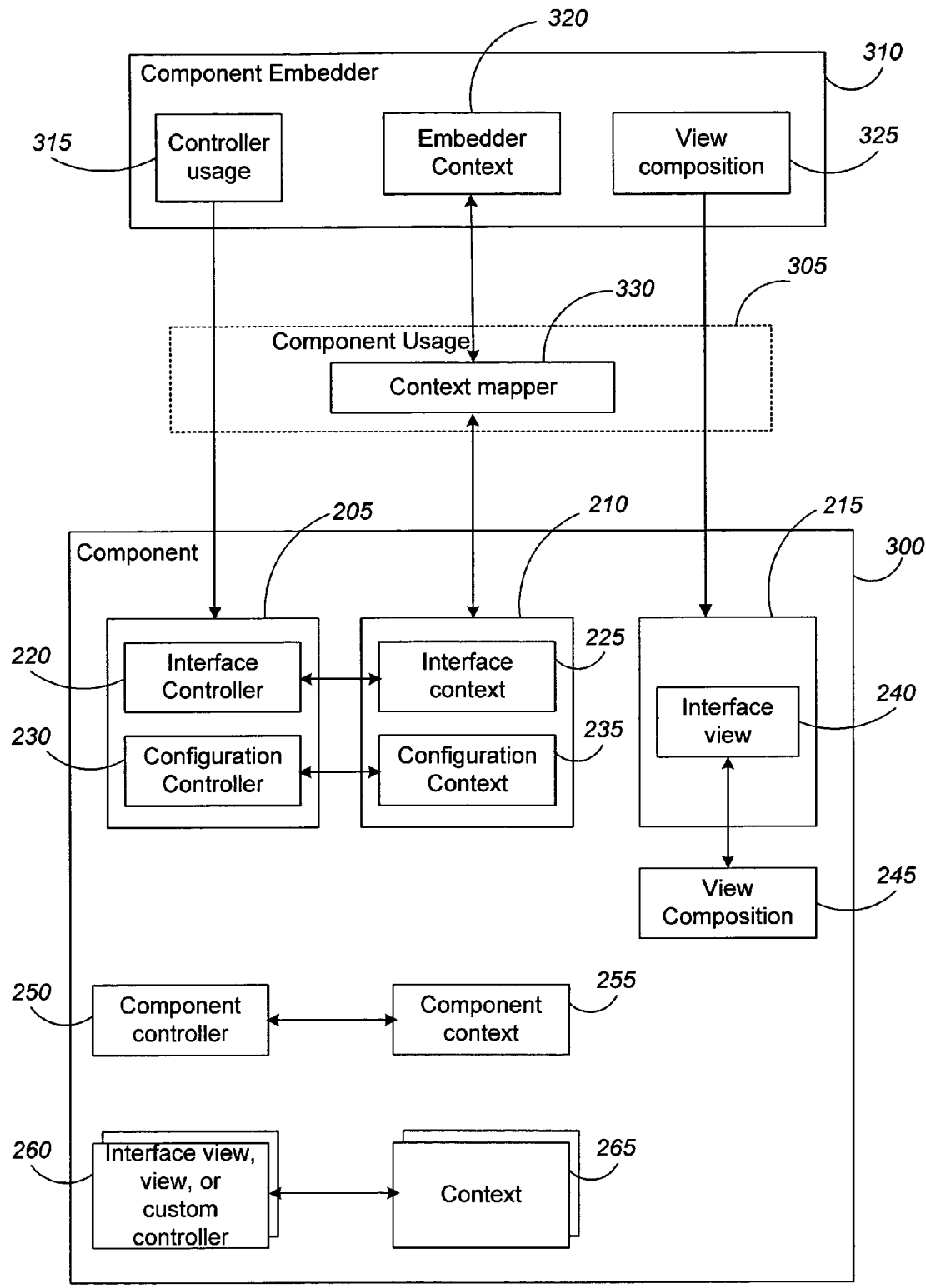
FIG. 3 is a block diagram of a system for accessing an embedded component instance.

FIG. 3 is a block diagram of a component embedder 310 using an instance 300 of an embedded component 200, at runtime. The embedded component instance 300 is created at runtime. The embedded component 200 is reusable and several instances 300 of the embedded component 200 can be used at the same time. In the implementation shown in FIG. 3, the runtime framework provides the services necessary for managing multiple component instances 300. Services provided by the runtime framework include the creation of component instances, e.g., using a component factory method to create component instances, and managing the lifecycle of component instances, e.g., deleting component instances embedded by a component embedder when the component embedder is deleted. Thus, neither the component embedder nor the embedded component 200 needs to include code for managing multiple component instances 300. Component usage object 305 is an object provided by the application development framework 105 to manage multiple component instances. Each component usage object 305 is associated with a component.

Component usage object 305 provides life-cycle management of the associated component 200 by providing methods for creating and deleting component instances 300 of the associated component 200 at runtime. The life-cycle of the component instance 300 is controlled by the component embedder 310. At design time an application programmer programs using a programming interface for a component without specifying a particular implementation of the component. The component programming interface used by the application programmer at design time is bound to a component implementation that provides the programming interface at run time. At run time, the component embedder 310 creates the component instance 300, implementing the component programming interface used by the component embedder, by calling the methods provided by the component usage object 305. The component usage object 305 responds to requests to create a component instance by selecting a component in the repository 110 that implements the desired programming interface and creating an instance of the selected component. Alternatively, if the application programmer specifies a component implementation at design time, an instance of the specified component can be created and used at runtime.

The runtime framework uses component usage object 305 to access the programming interface of the associated component. The component usage object 305 is also used to manage event subscriptions for the associated component. In an implementation where a component embedder can subscribe to events generated by embedded components, the component usage object 305 caches the event subscriptions for subscribing component, if there is no instance of the subscribing component (because the subscribing component has not been created or because it has been deleted). In such a situation, the event subscriptions are delivered to the subscribing component when the subscribing component is instantiated. Component usage object 305 includes a context mapper 330 that maintains context mappings between the embedder context 320 of the component embedder 310 and the component instance 300. The component usage object 305 caches specified context mappings for a component that has not been instantiated, and creates the specified context mappings for the component after the component has been instantiated.

Context is a local data structure for a controller that stores data and state specific to the controller. Controllers within a component, i.e., the interface controller, the configuration controller, the component controller, custom controllers, and view controllers, communicate data by mapping contexts. Similarly, the data binding interface allows the component embedder 310 to communicate data with the embedded component 300 by mapping the interface context 225 and the configuration context 235 using the context mapper 330.

Figure 6:
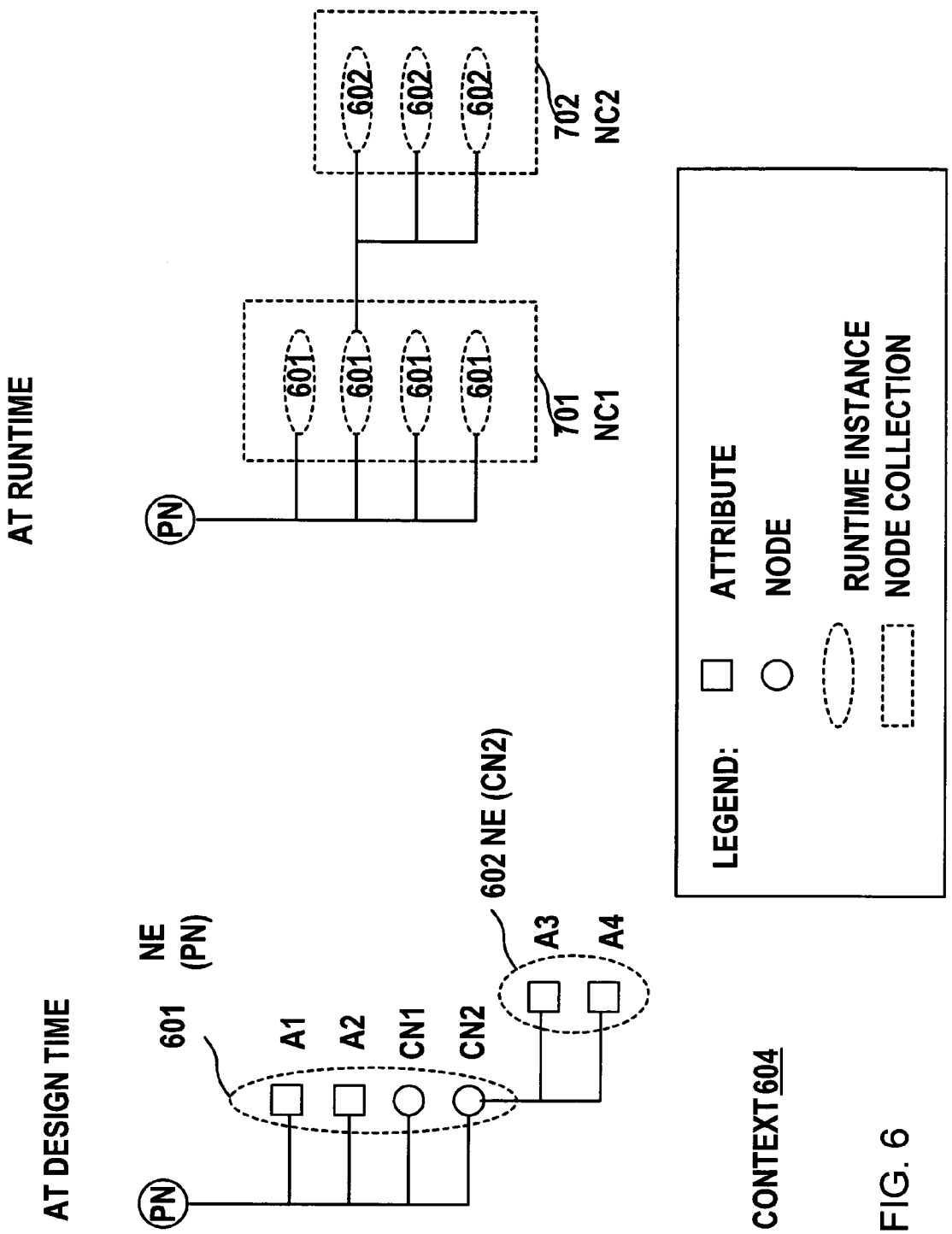
FIG. 6 illustrates an example of a structure of a context at design time and at runtime.

FIG. 6 illustrates an example of a structure of a context 604 at design time and at runtime. In general, structure elements of the design time context structure are different from structure elements of the runtime context structure.

An example of a design time context structure is a node hierarchy, wherein the structure elements of the node hierarchy can be nodes and attributes. The root-node of the node hierarchy represents the context itself. For example, the child nodes of the root node can be defined by the application. Child nodes of the root node will also be referred to as independent nodes. Child nodes of independent nodes depend on their corresponding parent node and will also be referred to as dependent nodes.

A node has a node type. Examples of node types are value nodes and model nodes. A value node can maintain, that is, store and administrate, its own application data (transient application data). The data can be, for example, scalar data, tables or structures. A model node includes a reference to application data that persists in a corresponding model.

The parent node can also have attributes. Each child node can include an arbitrary tree structure that includes further child nodes and/or attributes. Attributes are leaves in the tree structure. Attributes represent, for example, scalar data types, such as strings and integers or Java types (e.g., java.util.Date).

In the example of FIG. 6, at design time, the context 604 includes the independent node PN that includes the two attributes A1, A2 and that is the parent node of the dependent nodes CN1, CN2. The second dependent node CN2 has two further attributes A3, A4. This structure defines a first node element 601 for the parent node PN and a second node element 602 for the second child node CN2. The first node element 601 includes information about the context structure with regards to the parent node PN. In other words, it summarizes all information that is available at the context structure level that is under the level of the parent node PN. The second node element 602 includes information about the context structure with regards to the second dependent node CN2. The context structure implies that the second node element 602 depends on the first node element 601.

At runtime, structure elements (e.g., nodes) represent a set of data instances. Nodes provide type information about object instances that are maintained by the node. Each node can have a node collection, wherein each element of the node collection has the same node element type.

In the example of FIG. 6, at runtime, the parent node PN has a first node collection 701 that includes multiple runtime instances of the first node element 601. Each runtime instance of the first node element 601 can have a second node collection 702 of multiple runtime instances of the second node element 602. A node collection can be empty or has at least one instance of the corresponding node element.

A node collection has a cardinality and a node collection type, such as list, tree, set, or collection. The node collection cardinality (see table 2) and the node collection type (see table 1) can be declared at design time. An evaluation mechanism can be used to automatically evaluate the node collection of a child node at runtime when its parent node changes.

TABLE 1

Examples of node collection types

| Value | Meaning |
| --- | --- |
| Collection | forward-only iterator (cursor) without absolute positioning |
| Set | no duplicates, forward-only iterator without absolute positioning |
| List | duplicates allowed, position available, list iterator, absolute positioning (indexed access) |

The application can use the cardinality of a node collection to restrict possible operations on a node (e.g., prohibit indexed access to a node that has at most one node collection element).

TABLE 2

Examples of the cardinality of a node collection

| Value | Meaning |
| --- | --- |
| 0 . . . 1 | node collection can be empty, contains at most one element |
| 1 . . . 1 | node collection always contains exactly one element. |
| 0 . . . n | node collection can be empty or contain any number of elements |
| 1 . . . n | node collection always contains at least one element. |

The content of a node collection can be determined in various ways.

The node values of independent nodes can be set by initializers or event handlers or can be set through a supply function. The supply function is called when the node is accessed. To access a node, for example, the node is queried for its data by application code or by a user interface (UI) element (of the view) that is bound to the node.

Dependent nodes can get their values by using a supply function. For example, the node collection of a dependent node can become obsolete when a selection of its parent node changes. In this case the dependent node is recalculated, that is, the content of its node collection is determined on a subsequent access. In another example a representation instance is created for each dependent node of a parent node. The values of the representation instances are calculated when the corresponding parent node is accessed. In other words, using representation instances enables a "load data on demand" or a "unload data when not needed" mechanism. Therefore, memory is used in an efficient manner.

The content of a node collection can also be explicitly set to a state, such as "invalid" or "unfilled". When the node is accessed the next time, the node collection content is determined again. This can be used to force a re-read of modified data when the modification (e.g., in the model) was not visible to the application runtime.

Figure 7:
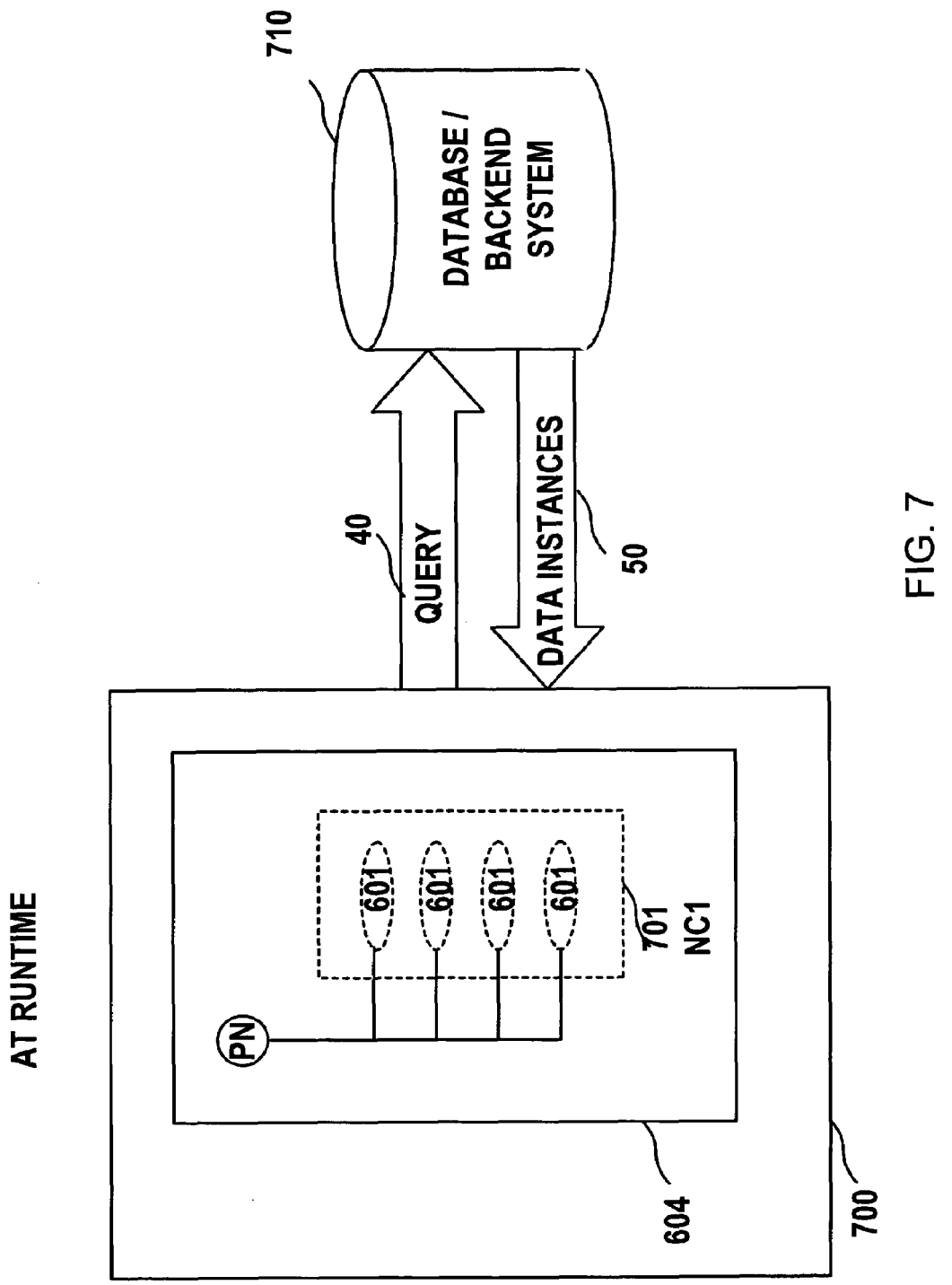
FIG. 7 illustrates the context at runtime as a set of data instances.

FIG. 7 illustrates the context 604 at runtime as a set of data instances. The nodes of the context at runtime represent a system-managed set of data instances (e.g., a java.sql.RecordSet). For example, data instances are returned 50 from a database or backend system 710 in response to a query (e.g., a structured query language (SQL) query) that is sent 40 from the computer system 700 to the database/backend system 710 when a node is accessed, for example, by an application. Examples of backend systems are Enterprises Resource Planning systems, Customer Relationship Management systems, web server systems providing web services or any other system that stores application data. Accessing a node means requesting data from the corresponding model. This can result in a corresponding query request from the model to the database/backend system 710. Nodes provide type information about object instances that are maintained by the node. The type information can also be derived from the model. For example, if the parent node PN corresponds to a customer, its node collection 701 can include all orders for this customer. When the application accesses the parent node PN the computer system 700 can sent 40 a query to retrieve all orders of the customer from the corresponding database/backend system 710, such as a sales and distribution (SD) system or a customer relationship management (CRM) system. The retrieved orders (data instances) are then returned 50 to the computer system 700 context 604 to fill the corresponding data of elements of the node collection 701.

Figure 8:
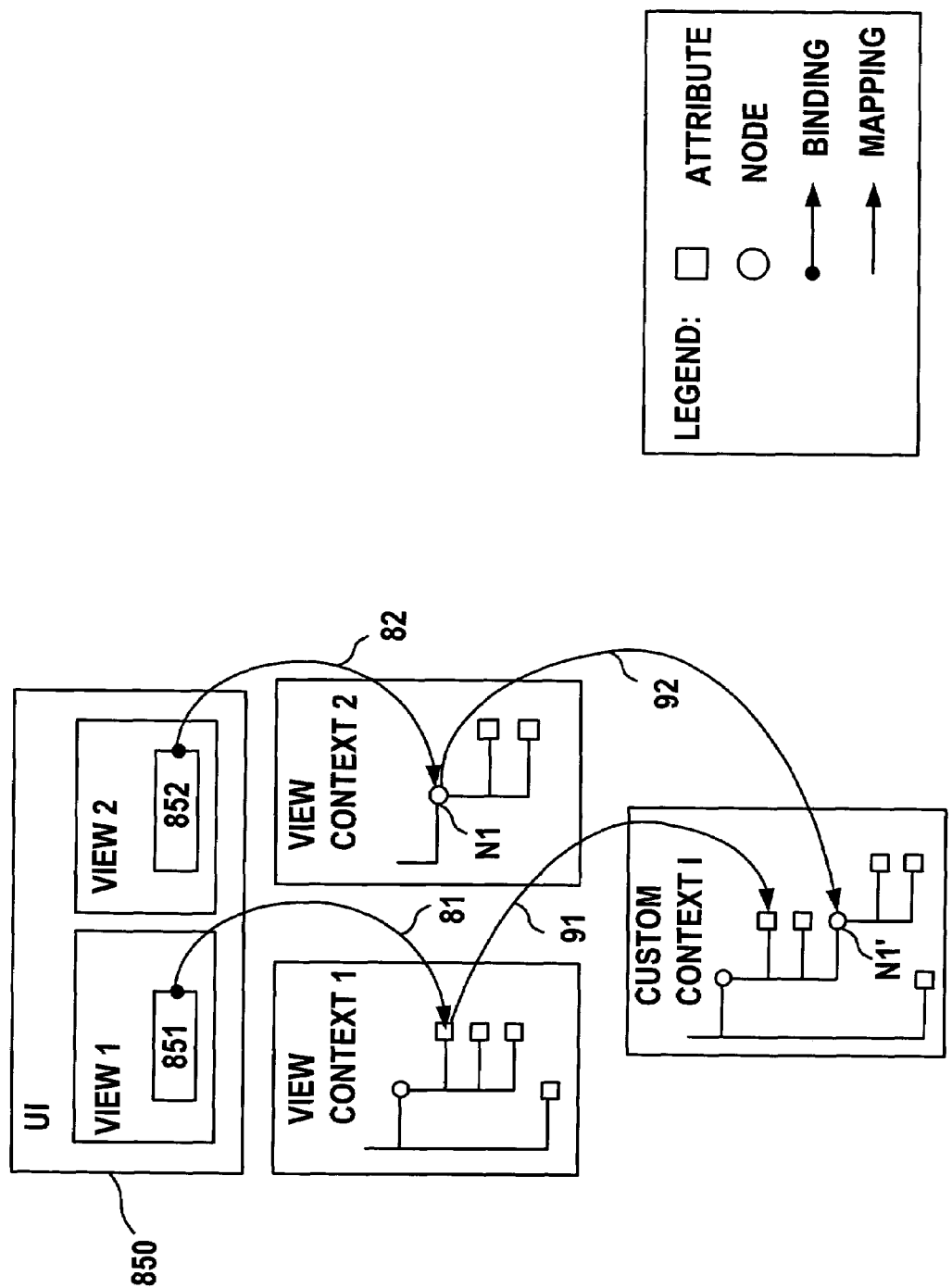
FIG. 8 illustrates mapping of contexts according to the present invention.

FIG. 8 illustrates mapping of contexts according to the present invention.

Because UI elements (e.g., UI elements 851, 852) of views (e.g., VIEW 1, VIEW 2) that are used in a user interface (UI) 850 bind 81, 82 to view contexts (e.g., VIEW CONTEXT 1, VIEW CONTEXT 2) and long persisting data can reside in custom contexts (e.g., CUSTOM CONTEXT I), an embodiment of the present invention enables mapping 91, 92 of nodes/attributes of view contexts or custom contexts to nodes/attributes of custom contexts. In other words, nodes and attributes of view contexts or custom contexts can reference type-compatible nodes and attributes in other custom contexts. Nodes can also be mapped to other nodes within the same context. Node mapping reduces the need for copying data between several contexts by enabling a node N1 of a first context (e.g., a view context, such as VIEW CONTEXT 2, or a custom context) to reference 91 a node N1' of a second context (e.g., a custom context, such as CUSTOM CONTEXT I, or an application context), where the node N1' of the second context has or references the data. The same is true for attributes.

Therefore, the data can be manipulated in a custom/application context and each view context that references the custom/application context provides its view with the current data stored in the custom/application context. Mapping contexts can span multiple context levels. That is, a custom context can reference a further custom context. Therefore, context hierarchies can be created (see FIG. 7).

For example, related data can be collected in a dedicated custom context. The binding to this data is implemented by using a view context that is mapped to the custom context accordingly.

The extended MVC pattern enables an application developer to quickly modify an application while maintaining consistency of the application. For example, in some cases rearrangement of views or UI elements can be achieved without modifying the corresponding controller code. This provides a way for an application developer to better structure applications in light of potential functional enhancements or changes. For example, reusing a field that already exists on one view in other views can be achieved by defining the corresponding mapping while the corresponding controller code stays valid.

The following examples explain various features of context mapping that can be implemented with the present invention.

FIRST EXAMPLE

If a node M ("Mapped Node") is mapped to a node O ("Origin Node"), node M maps its node collection to node O's node collection. The node selections of nodes M and O can be mapped. Node M can also maintain its own node selection on node O's node collection.

For example, the node collection cardinality of node M equals that of node O (e.g., by inheritance).

The selection cardinality can be inherited from origin node O. Node M can override the node cardinality inherited from node O.

If node O is a singleton node, node M is a singleton node, too. If node O is a non-singleton node, node M can be a singleton or non-singleton node. If node M is a non-singleton node it shares the same parent node collection with node O. If node M is a singleton node, then the collection of node M follows the instance of node O that belongs to the lead selection of node O's parent node.

For mapped nodes, the content of the node collection can be defined by the node collection of the origin node.

SECOND EXAMPLE

An independent node can always be mapped. It can be mapped to any other node in the same context or to any other node in another custom context (as long as no cycle is formed with regards to parent-child and mapping relationships).

A child node of a mapped node can be unmapped. In this case its content can be determined by the supply function mechanism.

When a parent node is mapped to a further parent node, a child node of the parent node can be mapped to a further child node of the further parent node. In other words, if node W is a child of node X and node Y is a child of node Z, node W can be mapped to node Y if node X is mapped to node Z.

If a child node of a mapped node is mapped to a further child node of the corresponding origin node, then either the mapped node maps to the node selection of the origin node or the origin node is a non-singleton node. This avoids a conflict between the dependencies implied by the parent/child relationship and the mapping relationship that results from mapping a selection of a child node of an unmapped node.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results

What is claimed is:

1. A computer program product, tangibly embodied in a machine-readable storage device comprising instructions operable to cause a data processing apparatus to:

implement a reusable component encapsulating functionality, multiple instances of the reusable component being usable at the same time;

the reusable component having at least one visual representation;

the reusable component having a programming interface for programmatic interaction with the reusable component;

the reusable component having a data-binding interface for data communication with the reusable component; and the reusable component having a visual interface for access to the at least one visual representation of the reusable component;

receive an event subscription directed to a subscribing component when the subscribing component has not been instantiated, the event subscription specifying subscriptions to one or more events generated by sub-components embedded by the subscribing component;

cache events generated by the sub-components that are specified by the event subscription while the subscribing component has not been instantiated;

forward any cached events to an instance of the subscribing component after the subscribing component is instantiated;

receive one or more context mappings for a component, the context mappings being specified by a component embedder to exchange context data with the component, the context data comprising interface data and configuration data;

if the component has not been instantiated, cache the specified context mappings; and create the specified context mappings for the component after the component has been instantiated.

2. The computer program product of claim 1, wherein the programming interface, the data-binding interface, and the visual interface are separate interfaces.

3. The computer program product of claim 1, further comprising instructions to implement one or more controllers for the reusable component, each controller having an associated context for storing data and state for the controller.

4. The computer program product of claim 3, further comprising instructions to implement one or more views for the reusable component, each view providing a visual representation of the reusable component.

5. The computer program product of claim 1, further comprising instructions to:
embed a sub-component into the reusable component.

6. The computer program product of claim 5 wherein the instructions to embed a sub-component comprise instructions to:
use a programming interface, a data-binding interface, and a visual interface of the sub-component.

7. The computer program product of claim 1 wherein the programming interface includes an interface controller having an interface controller context and a configuration controller having a configuration controller context, the visual interface includes an interface view, and the data-binding interface provides context mapping for the interface controller context and the configuration controller context.

8. A computer program product, tangibly embodied in a machine-readable storage device, the computer program product comprising instructions operable to cause a data processing apparatus to:

implement an application runtime framework, the framework being operable to:

receive a specification of a component interface to be used in an application without a specification of a corresponding component implementation, the component interface having a programming interface, a data-binding interface, and a visual interface; and instantiate a particular component implementation at application runtime, the particular component implementation being selected from one or more component implementations corresponding to the component interface;

receive an event subscription directed to a subscribing component when the subscribing component has not been instantiated, the event subscription specifying subscriptions to one or more events generated by sub-components embedded by the subscribing component;

cache events generated by the sub-components that are specified by the event subscription while the subscribing component has not been instantiated;

forward any cached events to an instance of the subscribing component after the subscribing component is instantiated;

receive one or more context mappings for a component, the context mappings being specified by a component embedder to exchange context data with the component, the context data comprising interface data and configuration data;

if the component has not been instantiated, cache the specified context mappings; and create the specified context mappings for the component after the component has been instantiated.

9. A method, comprising:

implementing a reusable component encapsulating functionality, multiple instances of the reusable component being usable at the same time;

the reusable component having at least one visual representation;

the reusable component having a programming interface for programmatic interaction with the reusable component;

the reusable component having a data-binding interface for data communication with the reusable component; and the reusable component having a visual interface for access to the at least one visual representation of the reusable component;

storing the reusable component;

receiving an event subscription directed to a subscribing component when the subscribing component has not been instantiated, the event subscription specifying subscriptions to one or more events generated by sub-components embedded by the subscribing component;

caching events generated by the sub-components that are specified by the event subscription while the subscribing component has not been instantiated;

forwarding any cached events to an instance of the subscribing component after the subscribing component is instantiated;

receiving one or more context mappings for a component, the context mappings being specified by a component embedder to exchange context data with the component, the context data comprising interface data and configuration data;

if the component has not been instantiated, caching the specified context mappings; and creating the specified context mappings for the component after the component has been instantiated.

10. The method of claim 9, wherein implementing the reusable component comprises:

implementing the reusable component having the programming interface, the data-binding interface, and the visual interface as separate interfaces.

11. The method of claim 9, further comprising:

implementing one or more controllers for the reusable component, each controller having an associated context for storing data and state for the controller.

12. The method of claim 11, further comprising:

implementing one or more views for the reusable component, each view providing a visual representation of the reusable component.

13. The method of claim 9, further comprising:

embedding a sub-component into the reusable component.

14. The method of claim 13, wherein embedding the sub-component comprises:

using a programming interface, a data-binding interface, and a visual interface of the sub-component.

15. The method of claim 9, wherein implementing the reusable component comprises:

implementing the reusable component having the programming interface including an interface controller having an interface controller context and a configuration controller having a configuration controller context, the visual interface including an interface view, and the data-binding interface providing context mapping for the interface controller context and the configuration controller context.

* * * * *